(12) United States Patent
Guo

(10) Patent No.: US 11,633,694 B2
(45) Date of Patent: Apr. 25, 2023

(54) HEAT EXCHANGE DEVICE AND FREEZE DRYER

(71) Applicant: SHENZHEN BITEMAN TECHNOLOGY CO., LTD., Shenzhen (CN)

(72) Inventor: Ying Hui Guo, Shenzhen (CN)

(73) Assignee: Shenzhen Biteman Technology Co., Ltd., Guangdong (CN)

(*) Notice: Subject to any disclaimer, the term of this patent is extended or adjusted under 35 U.S.C. 154(b) by 0 days.

(21) Appl. No.: 15/733,649

(22) PCT Filed: Jun. 28, 2019

(86) PCT No.: PCT/CN2019/093755
§ 371 (c)(1),
(2) Date: Sep. 24, 2020

(87) PCT Pub. No.: WO2020/093713
PCT Pub. Date: May 14, 2020

(65) Prior Publication Data
US 2021/0008493 A1  Jan. 14, 2021

(30) Foreign Application Priority Data

Nov. 6, 2018   (CN) .......................... 201811313861.X
Nov. 6, 2018   (CN) .......................... 201821825692.3
May 13, 2019  (CN) .......................... 201910394891.6

(51) Int. Cl.
*B01D 53/26* (2006.01)
*F28F 1/16* (2006.01)
(Continued)

(52) U.S. Cl.
CPC ............. *B01D 53/265* (2013.01); *F28D 7/10* (2013.01); *F28F 1/16* (2013.01); *F28F 1/22* (2013.01);
(Continued)

(58) Field of Classification Search
CPC ......... B01D 53/265; F28D 7/10; F28D 7/106; F28D 17/02; F28D 2021/0038;
(Continued)

(56) References Cited

U.S. PATENT DOCUMENTS 5,353,868 A    10/1994  Abbott
2004/0240182 A1* 12/2004 Shah ..................... H01L 23/467
                                                   361/704
(Continued)

FOREIGN PATENT DOCUMENTS

CN        1862151 A    11/2006
CN      108151286 A     6/2018
(Continued)

*Primary Examiner* — Eric S Ruppert
*Assistant Examiner* — Hans R Weiland
(74) *Attorney, Agent, or Firm* — Rosenberg, Klein & Lee

(57) ABSTRACT

A heat exchange device and a freeze dryer. The freeze dryer comprises a bearing device, and an evaporation device and a condensation device which are provided on the bearing device, at least one of the evaporation device and the condensation device comprising a structure of the heat exchange device. The heat exchange device is integrally molded by extrusion, and the heat exchange device is provided with at least one medium flow passage, a plurality of fins are formed on the outer periphery of the medium flow passage, and the fins being provided at intervals to form gaps allowing airflows to pass therethrough. The heat exchange device and the freeze dryer of the present disclosure can be designed to be smaller, reducing the volume, and facilitating miniaturization of products.

19 Claims, 14 Drawing Sheets

(51) Int. Cl.
    *F28F 1/22*         (2006.01)
    *F28D 7/10*         (2006.01)
    *F28F 1/42*         (2006.01)
    *F28D 21/00*       (2006.01)

(52) U.S. Cl.
    CPC ...... *F28F 1/422* (2013.01); *F28D 2021/0038* (2013.01); *F28F 2215/10* (2013.01); *F28F 2255/16* (2013.01)

(58) Field of Classification Search
    CPC ........ F28D 2021/007; F28D 2021/0071; F28F 1/16; F28F 1/22; F28F 1/405; F28F 1/422; F28F 7/02; F28F 2215/10; F28F 2215/12; F28F 2255/16
    See application file for complete search history.

(56) References Cited

U.S. PATENT DOCUMENTS

| | | | | |
|---|---|---|---|---|
| 2005/0066668 | A1* | 3/2005 | Barnwell | F28D 7/0016 62/93 |
| 2007/0284095 | A1* | 12/2007 | Wang | F28D 7/10 165/166 |
| 2008/0094800 | A1* | 4/2008 | Chen | F28F 1/20 361/704 |
| 2008/0121377 | A1* | 5/2008 | Lin | F28F 1/20 165/104.33 |
| 2009/0071624 | A1* | 3/2009 | Zhang | F28F 1/42 165/80.3 |
| 2010/0116466 | A1* | 5/2010 | Hawranek | F28F 1/14 165/104.19 |
| 2011/0146939 | A1* | 6/2011 | Bond | F28F 1/42 165/10 |
| 2012/0042691 | A1* | 2/2012 | Krumbholz | B01D 53/002 62/617 |
| 2013/0167517 | A1* | 7/2013 | Dupmeier | F28D 7/103 60/324 |
| 2013/0216444 | A1* | 8/2013 | Hartvigsen | F28F 1/40 422/198 |
| 2016/0333757 | A1* | 11/2016 | Miyairi | F25B 9/145 |
| 2017/0058708 | A1* | 3/2017 | Noureldin | F28D 21/0001 |
| 2017/0074528 | A1* | 3/2017 | De Piero | F25D 21/12 |
| 2017/0356692 | A1* | 12/2017 | Schaufler | F28F 21/062 |
| 2018/0003444 | A1* | 1/2018 | Markussen | F28D 7/12 |

FOREIGN PATENT DOCUMENTS

| | | |
|---|---|---|
| CN | 108168340 A | 6/2018 |
| CN | 108204753 A | 6/2018 |
| CN | 109351135 A | 2/2019 |
| EP | 2085733 A1 | 8/2009 |
| WO | 2020/093713 A1 | 5/2020 |

\* cited by examiner

HEAT EXCHANGE DEVICE AND FREEZE DRYER

CROSS-REFERENCE TO RELATED APPLICATIONS

This application is the 371 application of International Application No. PCT/CN2019/093755, filed on Jun. 28, 2019, which is based upon and claims priority to Chinese Patent Application CN201811313861.X, filed on Nov. 6, 2018, CN201821825692.3, filed on Nov. 6, 2018, and CN201910394891.6, filed on May 13, 2019, the entire contents of which are incorporated herein by reference.

TECHNICAL FIELD

The disclosure relates to the field of air purification, in particular to a heat exchange device and a freeze dryer.

BACKGROUND

Compressed air is an important power source in industrial manufacturing. Compressed air contains a lot of moisture. The moisture in compressed air can be dried by a freeze dryer, that is, the compressed air enters the evaporator and exchanges heat with the refrigerant in the evaporator thin tube. After the temperature drops, the moisture in the compressed air condenses into liquid water, and the moisture is filtered out of the machine through a water vapor separator to achieve the purpose of drying. The refrigerant in the evaporator thin tube is usually cooled by condenser and then recycled.

The evaporator and the condenser are two important heat exchange devices in freeze dryer. Their heat exchange efficiency determines the energy efficiency of a refrigeration system. The traditional evaporator or condenser is composed of a circuitous copper tube and radiating fins welded on the copper tube, and has low integration level and is large in the size.

SUMMARY

The disclosure provides a heat exchange device and a freeze dryer. The technical solution is as below:

According to a first aspect of embodiments of the present disclosure, the disclosure provides a heat exchange device, which is integrally molded by extrusion, comprising:

at least one medium flow passages; and a plurality of fins formed on the outer periphery of the medium flow passage, and arranged at intervals to form gaps allowing airflows to pass through.

According to a second aspect of embodiments of the present disclosure, the present invention provides a freeze dryer, comprising:

a bearing base body comprising an upper airflow chamber located at the upper end of the bearing base body and a lower airflow chamber located at the lower end of the bearing base body;

an evaporation device communicated with the upper airflow chamber and the lower airflow chamber, wherein the evaporation device cools and dries gas by evaporating the refrigerated medium;

a condensation device arranged between the upper end and the lower end of the bearing base body, and configured to cool the medium to deliver the refrigerated medium to the evaporation device;

at least one of the evaporation device and the condensation device comprising the above-mentioned heat exchange device.

It should be understood that the foregoing general description and the following detailed description are exemplary and explanatory only and cannot limit the present disclosure.

BRIEF DESCRIPTION OF THE DRAWINGS

The drawings herein are incorporated into the specification and form a part of the specification, showing embodiments in accordance with the disclosure, and are used together with the specification to explain the principles of the disclosure.

DETAILED DESCRIPTION

In order to further illustrate the principle and structure of the disclosure, the preferred embodiments of the disclosure will be described in detail with reference to the accompanying drawings.

Figure 1:
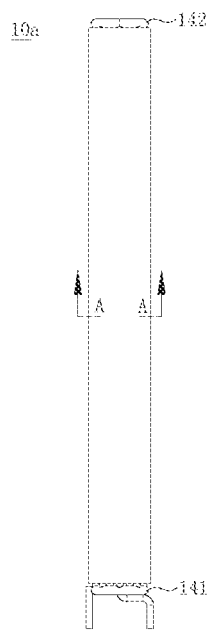
FIG. 1 is a schematic view, seen as from the front side, of a heat exchange device in an embodiment.
Figure 2:
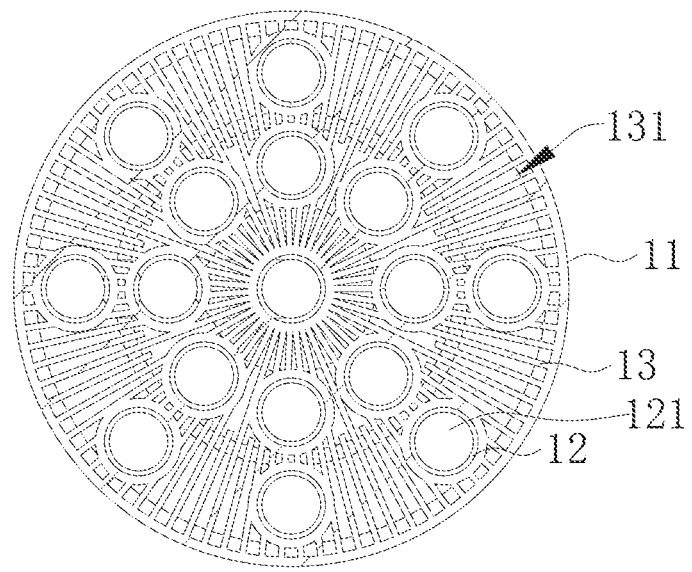
FIG. 2 is a schematic cross-sectional view along A-A in FIG. 1.

The disclosure provides a heat exchange device, as shown in FIGS. 1 and 2, FIG. 1 is a schematic view, seen as from the front side, of a heat exchange device in an embodiment, and FIG. 2 is a schematic cross-sectional view along A-A in FIG. 1. The heat exchange device 10a includes a housing 11, and a plurality of medium tubes 12 and a plurality of fins 13 arranged in the housing 11. A medium flow passage 121 is formed inside each medium tube 12.

The heat exchange device 10a can be used as a condensation device or an evaporation device. When the heat exchange device 10a is used as a condensation device, the refrigerant after heat absorption (or other refrigeration medium) is passed through the medium flow passage 121, and the refrigerant exchanges heat with other cooling medium to realize cooling of the refrigerant. When the heat exchange device 10a is used as an evaporation device, the refrigerant after refrigeration (or other refrigeration medium) is passed through the medium flow passage 121, and the refrigerant exchanges heat with the airflow to cool the airflow. The functions of the condensation device and the evaporation device will be described in detail below.

The housing 11 includes an upper end opening and a lower end opening. Airflow flows in from the upper end opening and flows out from the lower end opening. In other embodiments, the airflow can also flow in from the lower end opening of the housing 11 and flow out from the upper end opening. The housing 11 has a circular tube shape. In other embodiments, the housing 11 may also have a square tube shape.

The housing 11 can be integrally molded by extrusion with the medium tube 12 and the fins 13. In addition, the housing 11 can also be formed independently of the medium tube 12 and the fins 13, and the medium tube 12 and the fins 13 are integrally molded by extrusion.

The housing 11, the medium tube 12 and the fin 13 can be integrally molded by metal extrusion. The metal can be aluminum alloy or other materials with good heat transfer. This molding method makes the distribution of the medium tube 12 and the fin 13 more uniform and compact. Compared with the welding molding method, the gap size between the fins 13 can also become smaller, and to a certain extent, the heat exchange area is increased, thereby improving heat exchange efficiency; and the integrated molding method increases the accuracy of device molding and reduces the difficulty of manufacturing. In this way, the heat exchange device can be designed to be smaller, achieving the purpose of reducing the size and meeting people's desire for miniaturization. In addition, the integrated molding method can also improve production efficiency and reduce costs.

The heat exchange device 10a includes a plurality of medium tubes 12 arranged in the housing 11. One medium tube 12 of the plurality of the medium tubes 12 is located at the geometric center of the heat exchange device, and the remaining medium tubes 12 are radially distributed in a circumference around the geometric center. The fins 13 are connected between the medium tubes 12. Arranging the medium tube 12 in this way can improve the heat exchange efficiency between the medium in the medium tube 12 and the fins, and increase the range of the airflow heating or cooling. In addition, arranging the plurality of the medium tubes 12 increases the amount of medium entering the heat exchange device, which means that it can exchange heat with a larger amount of airflow, thereby improving efficiency and reducing time.

It should be noted that the geometric center of the heat exchange device 10a can be determined according to its cross-sectional shape. For example, in FIGS. 1 and 2, the heat exchange device is cylindrical as a whole, its cross-section is circular, and its geometric center is the center of the circular section. For another example, if the cross section of the heat exchange device is square or rectangular, its geometric center is the intersection of two diagonal lines. And so on, which are not listed in detail herein.

Furthermore, as shown in FIG. 2, the plurality of medium tubes 12 are distributed on a plurality of circles with different radii with the center of the cross section of the heat exchange device 10a as the center of the circle. Specifically, with the medium tube 12 in the center as the center, the remaining medium tubes 12 are arranged into a plurality of circles with different radii, and a plurality of medium tubes 12 are arranged at equal intervals or unequal intervals on each circle. With this arrangement, the medium tubes 12 can be evenly distributed at each position of the heat exchange device 10a, so that the medium in the medium tube 12 can evenly exchange heat with the airflow, and ensure that the temperature of the airflow after heat exchange is uniform.

The fin 13 extends in the height direction of the medium tube 12 and extends from the upper end to the lower end of the medium tube 12, which increases the heat dissipation area and further improves the heat transfer efficiency. The fin 13 is connected on the outer wall of each medium tubes 12. Specifically, the fin 13 is connected to the medium tube 12 located at the geometric center and extends in the radial direction thereof, that is, the fin 13 can extend from the medium tube 12 located at the geometric center to the housing 11.

Specifically, a plurality of fins 13 are arranged between the medium flow passage 121 and between the housing 11 and the medium flow passages 121. A gap 131 for airflow passage is formed between the fins 13. The fins 13 are distributed radially with the center line of the housing 11 as the center (or with the medium tube 12 located at the geometry center as the center), and are evenly arranged on the outer periphery of each medium flow passage 121. This distribution of the fins 13 increases the number of fins 13 arranged per unit area and increases the integration of the fins 13 per unit area, thereby improving the heat transfer efficiency per unit area.

Figure 3:
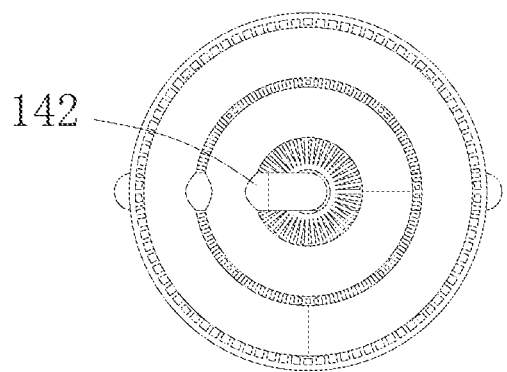
FIG. 3 is a top view of FIG. 1.
Figure 4:
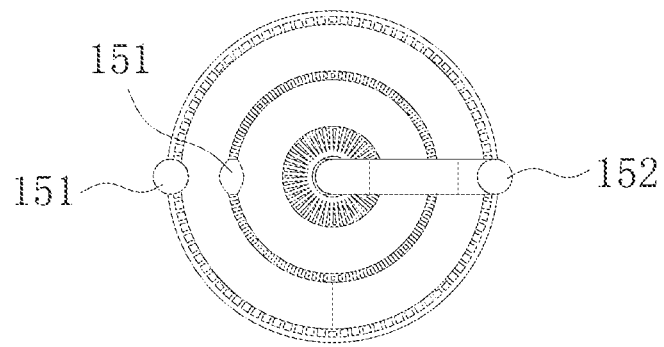
FIG. 4 is a bottom view of FIG. 1.

The medium flow passages 121 may be communicated in series or in parallel through connecting tubes. In one embodiment, as shown in FIG. 1, a connecting tube 141 is provided at the lower end of the housing 11, and the connecting tube 141 can be simultaneously communicated in parallel with a plurality of medium flow passages 121 along the radial direction of the housing 11. As shown in FIG. 3 and FIG. 4, FIG. 3 is a top view of FIG. 1, and FIG. 4 is a bottom view of FIG. 1. A medium inlet 151 is arranged at the lower end of the housing 11, which is communicated with the connecting tube 141 at the lower end of the housing 11, and the medium flows into the medium flow passages 121 connected to the connecting tube 141 through the medium inlet 151 and the connecting tube 141. The medium flow passages 121 that are not communicated with the connecting tube 141 can be communicated with the medium flow passages 121 through which the medium passes by another connecting tube 142, and finally the medium flow passages 121 are communicated with each other. A medium outlet 152 is arranged at the lower end of the housing 11, through which the medium in the medium flow passage 121 flows out.

In an embodiment, the heat exchange device 10a may be provided with one medium inlet and one medium outlet, and the medium flow passage 121 in the housing 11 are communicated in series through connecting tubes.

In an embodiment, the medium flow passages 121 may be communicated in parallel. Specifically, the upper end and the lower end of the housing of the heat exchange device 10a are respectively provided with an inlet manifold and an outlet manifold. The upper port of each medium flow passage 121 is communicated with the inlet manifold, and the lower port of each medium flow passage 121 is communicated with the outlet manifold. The medium flows from the inlet manifold into each medium flow passage 121 for heat exchange, and then converges in the outlet manifold, and finally flows out from the outlet manifold.

The location and quantity of the medium outlet and medium inlet can be changed according to the actual application. The communication between the medium flow passages may be serial communication, or parallel communication, or partial serial communication and partial parallel communication.

In addition, the number of medium flow passages can be determined according to actual applications. Alternatively, the number of medium circulation channels is more than two, which has a better cooling effect.

Figure 5:
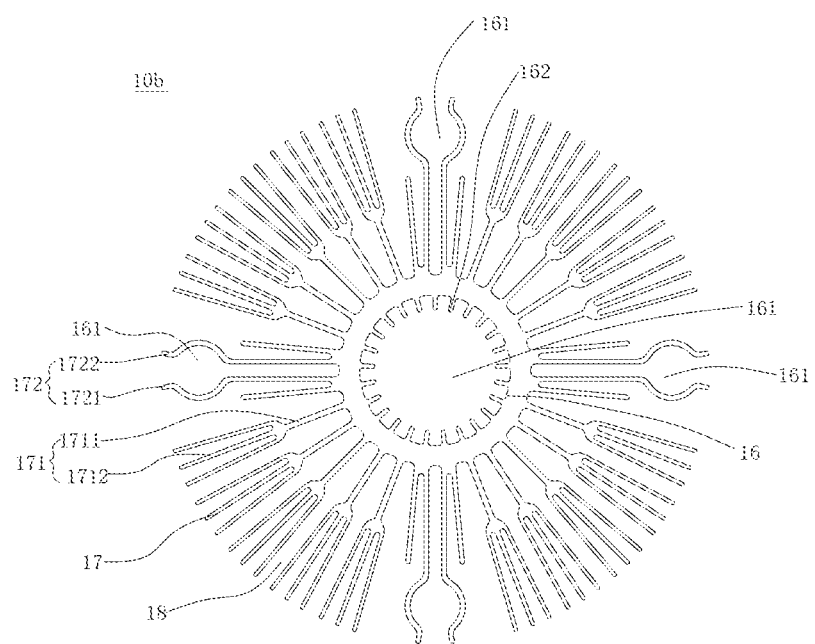
FIG. 5 is a schematic cross-sectional view of a heat exchange device in another embodiment.

As shown in FIG. 5, FIG. 5 is a schematic cross-sectional view of a heat exchange device in another embodiment. The heat exchange device 10b is integrally molded by extrusion, and the heat exchange device 10b is provided with at least one medium flow passage 161, a plurality of fins 17 are formed on the outer periphery of the medium flow passage 161, and are arranged at intervals to form gaps 18 allowing airflows to pass through.

The heat exchange device 10b has a cylindrical shape as a whole, whose cross-section is circular.

As shown in FIG. 5, the heat exchange device 10b includes a plurality of medium flow passages 161, a part of the medium flow passages 161 is formed by the medium tubes 16, and the other part of the medium flow passages 161 is formed by the fins 17.

The heat exchange device 10b includes a medium tube 16 located at the geometric center of the heat exchange device 10b. It can be understood that the heat exchange device 10b may include a plurality of medium tubes 16, one of which is located at the geometric center of the heat exchange device 10b. The other part of the medium flow passages 161 formed by the fins 17 is distributed in a circumference around the medium tube 16 at the geometric center.

A plurality of the fins 17 are arranged on the outer peripheral wall of the medium tube 16 at intervals. The fins 17 extend in the height direction of the medium tube 16 and extend in the radial direction from the medium tube 16 located at the geometric center.

The fins 17 are fork-shaped or pliers-shaped. The fork-shaped fin 171 includes a rod part 1711 and a bifurcation part 1712, wherein the rod part 1711 is connected with the medium tube 16 located at the geometric center, and the bifurcation part 1712 is connected with the rod part 1711. The pliers-shaped fin 172 includes two oppositely arranged special-shaped fins 1721, 1722, wherein the end of the special-shaped fin 1721,1722 away from the geometric center is arc-shaped, and the medium flow passage 161 is formed by the arc-shaped ends of the two special-shaped fins 1721,1722 enclosing. The medium flow passage 161 extends from the upper end of the fin 17 to the lower end of the fin 17, that is, the medium flow passage 161 enclosed by the fins 17 and the medium flow passage 161 formed by the medium tubes 16 are equal in height. Here, the fins 17 are arranged in a fork shape or a pincer shape, which can increase the heat exchange area and improve the heat exchange efficiency.

As shown in FIG. 5, there are four pliers-shaped fins 172, which are respectively located directly above, directly below, directly left and directly right of the center of the circular cross section. However, it is not limited to this, and the number and position of the pliers-shaped fins 172 can be varied.

As mentioned above, the pliers-shaped fins 172 can form a medium flow passage 161 for the passage of the medium. In addition, the medium flow passage 161 formed by the pliers-shaped fins 172 can also be configured to be inserted a support rod so that the heat exchange device can be supported on the ground or on other equipment, for example, in FIG. 5, the medium flow passages 161 located directly on the left and right are configured to circulate the media, and the two medium flow passages 161 located directly above and directly below are inserted into the support rods for supporting. In this way, the medium flow passage 161 has two functions, and can be configured to insert into a support rod when it is not configured for circulation of the medium.

Continuing to refer to FIG. 5, the inner wall of the medium tube 16 protrudes inwardly to form a plurality of protrusions 162, and the plurality of protrusions 162 are circumferentially distributed along the inner wall of the medium tube 16. In this way, the heat exchange area of the medium tube 16 can be increased, and the heat exchange efficiency can be improved.

Figure 6:
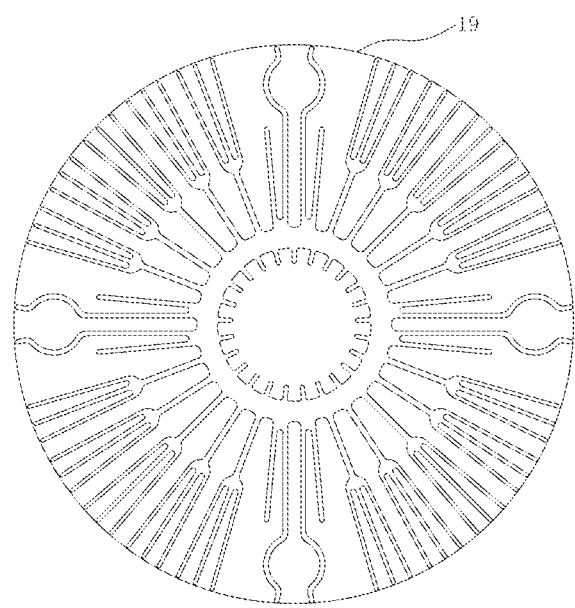
FIG. 6 is a schematic cross-sectional of a heat exchange device provided with a housing in an embodiment.

Further, as shown in FIG. 6, FIG. 6 is a schematic cross-sectional of a heat exchange device provided with a housing in an embodiment. The heat exchange device 10b further comprises a housing 19 that covers the medium tube 16 and fins 17. The housing 19 is integrally molded by extrusion with the medium tube 16 and the fins 17, or the medium tube 16 and the fins 17 are molded by extrusion, and the housing is formed independently of the medium tube 16 and the fins 17.

The housing 19, the medium tube 16 and the fins 17 can be all made of aluminum alloy. The aluminum alloy material has good thermal conductivity, thereby can improve the heat exchange efficiency of the heat exchange device 10b.

Figure 7:
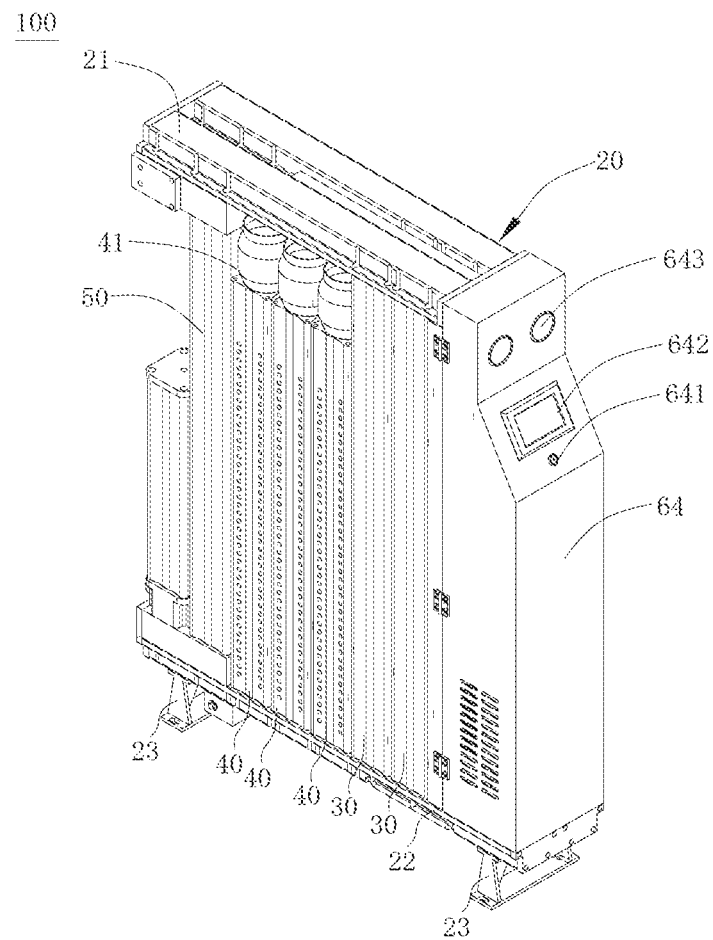
FIG. 7 is a schematic perspective view of a freeze dryer in an embodiment of the disclosure.
Figure 8:
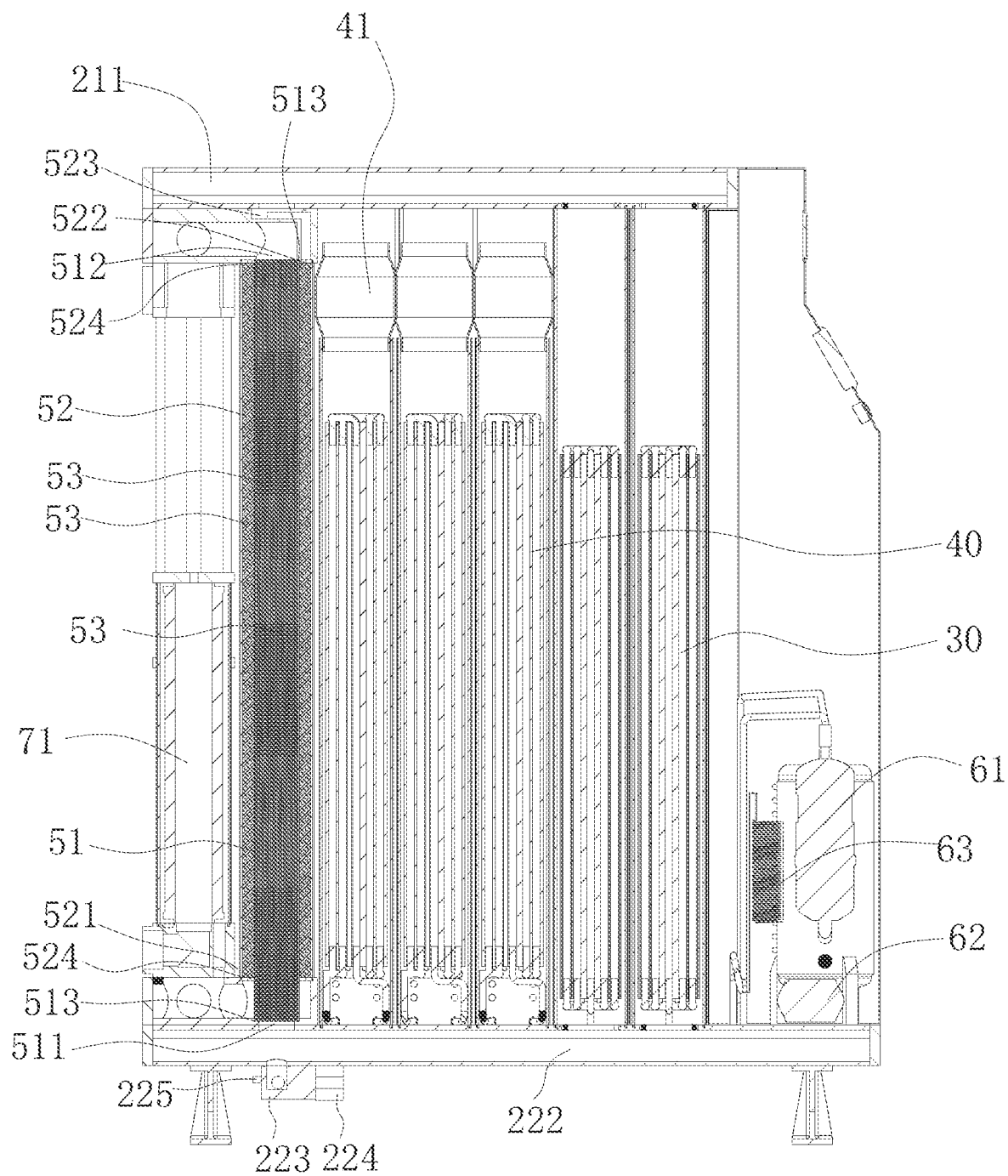
FIG. 8 is a longitudinal cross-sectional view of a freeze dryer in an embodiment of the disclosure.

In an embodiment, the disclosure provides a freeze dryer including a heat exchange device 10a or a heat exchange 10b with the structure described above. Specifically, as shown in FIG. 7 and FIG. 8, FIG. 7 is a schematic perspective view of a freeze dryer in an embodiment of the disclosure, and FIG. 8 is a longitudinal cross-sectional view of a freeze dryer in an embodiment of the disclosure. The freeze dryer includes a bearing base body 20, an evaporation device 30 and a condensation device 40.

A bearing base body 20 comprising an upper airflow chamber seat 21 located at the upper end of the bearing base body 20 and a lower airflow chamber seat 22 located at the lower end of the bearing base body 20. An upper airflow chamber 211 is formed in the upper airflow chamber seat 21, and a lower airflow chamber 222 is formed in the lower airflow chamber seat 22. The bottom of the lower airflow chamber seat 21 is further provided with two legs 23, which are configured to support the bearing base body 20.

The evaporation device 30 and the condensation device 40 are arranged between the upper airflow chamber seat 21 and the lower airflow chamber seat 22.

As shown in FIG. 8 and FIG. 2, both the evaporation device 30 and the condensation device 40 can include a heat exchange device 10a (or a heat exchange device 10b). Here, taking the evaporation device 30 and the condensation device 40 included heat exchange device 10a as an example, both the evaporation device 30 and the condensation device 40 include: a housing, and a plurality of medium tubes and a plurality of fins arranged in the housing, and the inside of each medium tube has a medium flow passage formed. The shape, structure, and molding method of the housing, the medium tube, and the fins are the same as those of the heat exchange device 10a described above, so the internal structure of the evaporation device 30 and the condensation device 40 will not be described in detail here. The evaporation device 30 and the condensation device 40 can adopt the same structure, but the medium passing through the medium flow passage 121 of the two is slightly different, and the functions realized by the devices are also different.

The evaporation device 30 is configured to cool and dry gas (for example, compressed air). The medium passed through the medium flow passage 121 of the evaporation device 30 is a refrigerated medium, for example, a low-temperature and low-pressure refrigerant. The gas passed through the gap between the fins of the evaporation device 30 is the gas to be cooled and dried. The gas to be cooled and dried enters the housing 11 through the gap 131 between the fins 13 and contacts with the outer wall of the medium flow passage 121 to exchange heat. The medium in the medium flow passage 121 absorbs heat and is warming, and the temperature of the gas after being absorbed is lowered. The saturated water vapor in the gas condenses into water droplets and is separated from the gas, thereby achieving the purpose of cooling and drying the gas. The water droplets fall into the lower airflow chamber 222 communicated with the evaporation device 20 under the action of gravity, and converge in the water storage chamber provided under the lower airflow chamber 222. A drain valve seat 223 is provided in the water storage chamber, and a drain valve and a drain cylinder 224 that drives the drain valve to open and close are provided on the drain valve seat 223. The drain cylinder 224 can regularly drain the water collected in the water storage chamber from the drain port 225.

Figure 9:
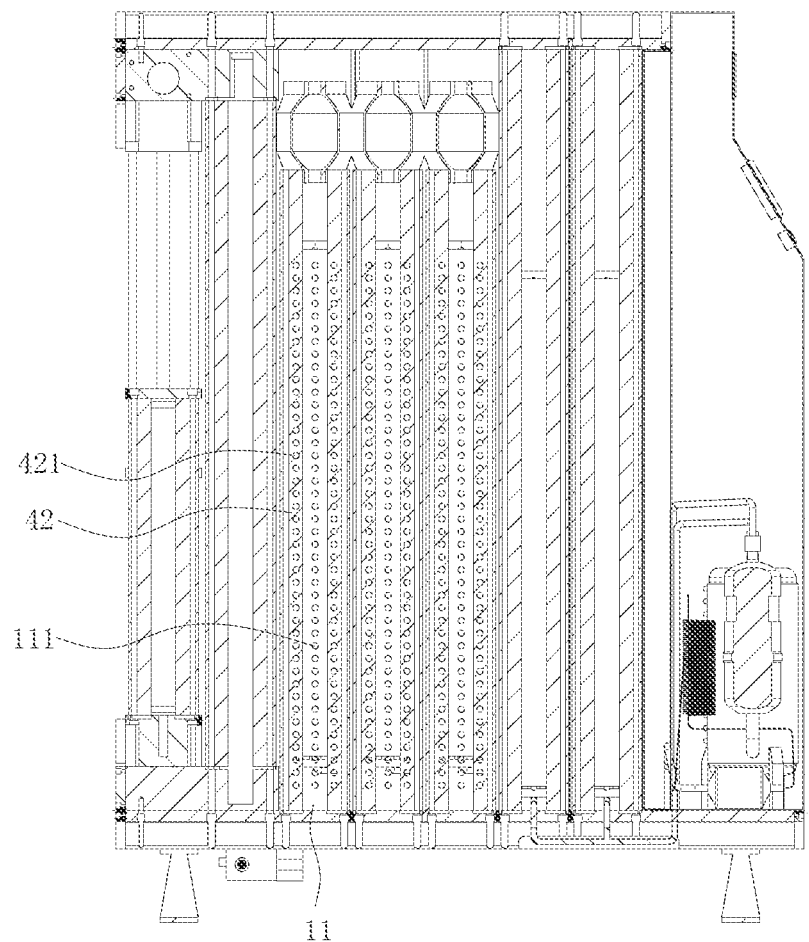
FIG. 9 is a longitudinal cross-sectional view of a freeze dryer in an embodiment of the disclosure from another perspective.

The condensation device 40 is configured to cool a medium (for example, a refrigerant) heated by absorption. The medium passed through the medium flow passage 121 of the condensation device 40 is a heat-absorbed medium, for example, a high-temperature and high-pressure refrigerant. A fan 41 is also arranged above the condensation device 40. The air outlet of the fan 41 is opening to the upper end of the housing 11 of the condensation device 40. When the blades of the fan 41 rotate, the air circulation in the housing 11 can be accelerated to enable the medium flowing in the medium flow passage 121 to be rapidly cooled down, thereby achieving the purpose of the refrigeration of the medium by the condensation device 40. As shown in FIG. 9, FIG. 9 is a longitudinal cross-sectional view of a freeze dryer in an embodiment of the disclosure from another perspective. In order to accelerate air circulation, a plurality of ventilation holes 111 may further be provided on the housing 11 of the condensation device 40. In addition, the condensation device 40 further includes an outer shell 42 sleeved on the outer periphery of the housing 11, and the fan 41 is installed on the top of the outer shell 42. A plurality of ventilation holes 421 are arranged on the wall of the outer shell 42 to accelerate the flow of the airflow in the housing 11.

In the above embodiment, the structure of the heat exchange device 10*a* (or the heat exchange device 10*b*) is adopted to the evaporation device 30 and the condensation device 40 to realize heat exchange, but it is not limited to this, and it may also one of the evaporation device 30 and the condensation device 40 that adopts the structure of the heat exchange device 10*a*, that is to say, the other device that not adopt the structure of the heat exchange device 10*a* can adopt a traditional heat exchange device for heat exchange, for example, a heat exchange device composed of a circuitous copper tube and radiating fins welded on the copper tube.

The medium circulating in the medium flow passage 121 of the evaporation device 30 and the condensation device 40 may be cooling water, cooling liquid or refrigerant. When the medium is the refrigerant, the freeze dryer 100 further includes a refrigerant compressor 61, a refrigerant filter 62, and a throttling device 63.

The refrigerant compressor 61 is configured to compress the refrigerant vaporized in the evaporation device 30 into the low-temperature and high-pressure liquid refrigerant, and deliver to the medium flow passage 121 in the condensation device 40 for refrigeration. The refrigerant filter 62 is configured to filter impurities in the low-temperature and high-pressure liquid refrigerant output from the condensation device 40. The throttling device is configured to decompress the low-temperature and high-pressure liquid refrigerant filtered by the refrigerant filter into a low-temperature and low-pressure liquid refrigerant, and to deliver the decompressed low-temperature and low-pressure liquid refrigerant to the medium flow passage in the evaporation device 30.

As shown in FIG. 8, the refrigerant compressor 61, the refrigerant filter 62 and the throttling device 63 are all arranged on the side area of the bearing base body 20. Such a layout can reduce floor space, improve product integration, and facilitate product miniaturization.

As shown in FIG. 7, the refrigerant compressor 61, the refrigerant filter 62 and the throttling device 63 may be sealed in a sealed box 64. The sealed box 64 can also be provided with a control panel 642, a power button 641, and a refrigerant pressure gauge 643.

Figure 10:
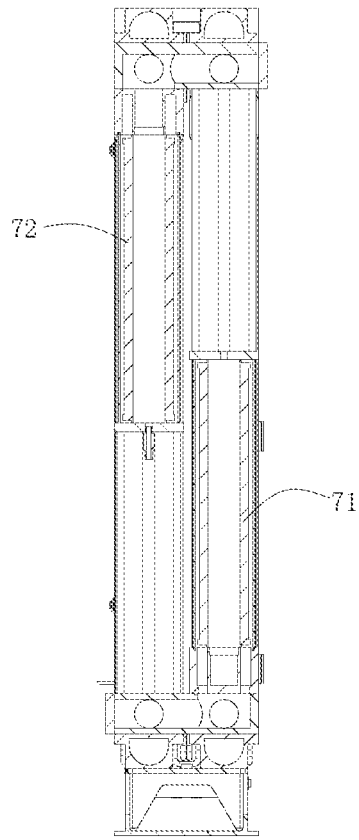
FIG. 10 is a schematic horizontal section view of a freeze dryer in an embodiment of the disclosure.

As shown in FIG. 10, FIG. 10 is a schematic horizontal section view of a freeze dryer in an embodiment of the disclosure. The freeze dryer 100 further includes an air inlet filter 71 and an air outlet filter 72 for filtering impurities such as dust, oil and the like. The air inlet filter 71 is communicated with the air inlet of the freeze dryer 100, and the air to be cooled and dried (for example, compressed air) can enter the freeze dryer 100 through the air inlet. The air outlet filter 72 is communicated with the air outlet of the freeze dryer 100.

The temperature of the air after compressed is usually higher, generally around 40 degrees. The higher the temperature, the greater the energy consumption for cooling and drying. Since the air temperature is relatively low after the gas is cooled and dried, and the gas-using end usually has no special requirements for the temperature of the dried gas, it is possible to make full use of the dried gas with low temperature to pre-cool the gas to be cooled and dried. Specifically, as shown in FIG. 8, the freeze dryer 100 further includes a heat regeneration device 50, and the heat regeneration device 50 is disposed between the upper end and the lower end of the bearing base body 20. The heat regeneration device 50 includes a heat regeneration inner tube 51 and a heat regeneration outer tube 52 sleeved on the periphery of the heat regeneration inner tube 51.

Both ends of the heat regeneration outer tube 52 are respectively communicated with the air outlet of the air inlet filter 71 and the upper airflow chamber 211. More specifically, the gas inlet 521 of the heat regeneration outer tube 52 is communicated with the air outlet of the air inlet filter 71, and the gas outlet 522 of the heat regeneration outer tube 52 is communicated with the upper airflow chamber 211 through the outlet passage 523.

The above heat regeneration outer tube 52 is communicated with the air inlet through the air inlet filter 71. It can be understood that, in other embodiments, when there is no air inlet filter 71 arranged on the freeze dryer 100, the heat regeneration outer tube 52 may be directly communicated with the air inlet.

Both the upper end and the lower end of the heat regeneration outer tube 52 are provided with gaskets 524 for sealing the ends of the non gas inlet or the non gas outlet of the heat regeneration outer tube 52 to prevent gas leakage.

Two ends of the heat regeneration inner tube 51 are respectively communicated with the lower airflow chamber 222 and the air inlet of the air outlet filter 72. More specifically, the gas inlet 511 of the heat regeneration inner tube 51 is communicated with the lower airflow chamber 222, and the gas outlet 512 of the heat regeneration inner tube 51 is communicated with the air inlet of the air outlet filter 72.

The above heat regeneration inner tube 51 is communicated with the air outlet through the air outlet filter 72. It can be understood that, in other embodiments, when there is no air outlet filter 72 arranged on the freeze dryer 100, the heat regeneration inner tube 51 may be directly communicated with the air outlet.

Both the upper end and the lower end of the heat regeneration inner tube 51 are provided with gaskets 513 for sealing the ends of the non gas inlet or the non gas outlet of the heat regeneration inner tube 51 to prevent gas leakage.

The heat regeneration inner tube 51 is communicated with the evaporation device 30, and the airflow cooled and dried by the evaporation device 30 enters the heat regeneration inner tube 51 through the lower airflow chamber 222. The gas entering from the air inlet is filtered by the air inlet filter 71, and then enters the heat regeneration outer tube 52 to exchange heat with the cooled low-temperature airflow in the heat regeneration inner tube 52 to achieve pre-cooling. The pre-cooled gas enters the evaporation device 30 through the outlet passage 523 and the upper airflow chamber 211 in sequence for cooling and drying. The cooled and dried airflow enters the heat regeneration inner tube 51 through the lower airflow chamber 222, exchanges heat with the airflow in the heat regeneration outer tube 52, enters the air outlet filter 72 for filtering, and finally flows to the gas end from the air outlet.

Since the gas to be cooled and dried is pre-cooled before cooling and drying, the heat exchange in the evaporation device 30 can greatly reduce energy consumption, reduce the time required for cooling and drying, and improve efficiency.

Further, in one embodiment, both the heat regeneration inner tube 51 and the heat regeneration outer tube 52 are filled with a metal mesh 53, and the metal mesh 53 is configured to slow down the flow velocity of the airflow in the heat regeneration inner tube 51 and the heat regeneration outer tube 52, extend the heat exchange time and improve the heat exchange efficiency. The metal mesh 53 in the heat regeneration inner tube 51 is closely contact with the inner wall of the heat regeneration inner tube 51, and the metal mesh 53 in the heat regeneration outer tube 52 is tightly connected between the inner wall of the heat regeneration outer tube 52 and the outer wall of the heat regeneration inner tube 51. The tight connection between the metal mesh 53 and the tube wall enables the metal mesh 53 to quickly and fully transfer the absorbed heat to the tube wall, and then the tube wall transfers the heat to the outside to accelerate heat dissipation.

As shown in FIG. 7, the evaporation devices 30 and the condensation devices 40 are arranged in columns in the length direction of the bearing base body 20, and each column includes two evaporation devices 30 and three condensation devices 40. Here, the number of evaporation devices 30 and condensation devices 40 included in each column is not limited, and the number of evaporation devices 30 and condensation devices 40 in each column can be determined according to the airflow volume to be cooled and dried.

In addition, one column, two columns or more than two columns of the evaporation devices 30 and the condensation devices 40 can be arranged on the bearing base body of the freeze dryer 100. Here, the number of columns formed by the evaporation devices 30 and the condensation devices 40 is not limited. The number of columns included in the freeze dryer 100 can be determined according to the airflow volume to be freeze-dried.

Figure 11:
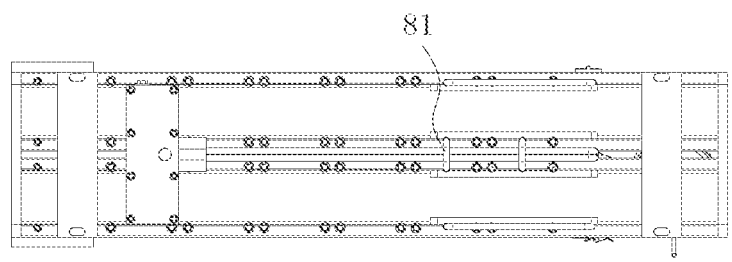
FIG. 11 is a bottom view of a freeze dryer in an embodiment of the disclosure.

As shown in FIG. 11, FIG. 11 is a bottom view of a freeze dryer in an embodiment of the disclosure. The medium flow passages between the plurality of evaporation devices 30 can be communicated in parallel or in series through the medium connecting tubes 81. Similarly, the medium flow passages of the plurality of condensation devices 40 may also be communicated in series or in parallel through medium connecting tubes.

Furthermore, the freeze dryer 100 of the disclosure can also be provided with a housing according to actual applications. The housing can cover the bearing base body 20, the evaporation device 30, the condensation device 40, the refrigerant compressor 61, the refrigerant filter 62 and the throttling device 63, the air inlet filter 71, the air outlet filter 72 and other components, to achieve dust-proof and beautiful effects.

Figure 12:
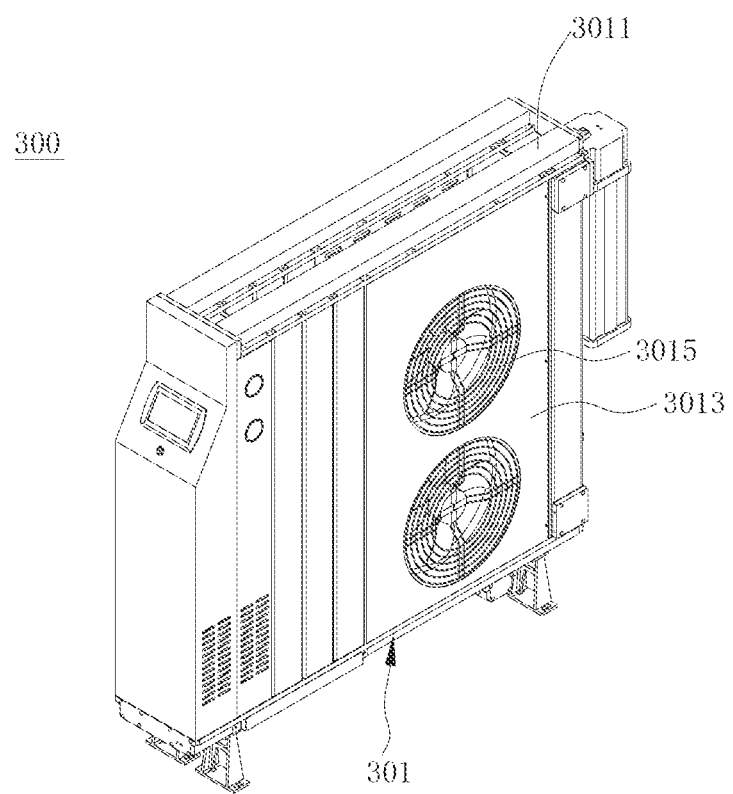
FIG. 12 is a schematic perspective view of a freeze dryer in another embodiment of the disclosure.
Figure 13:
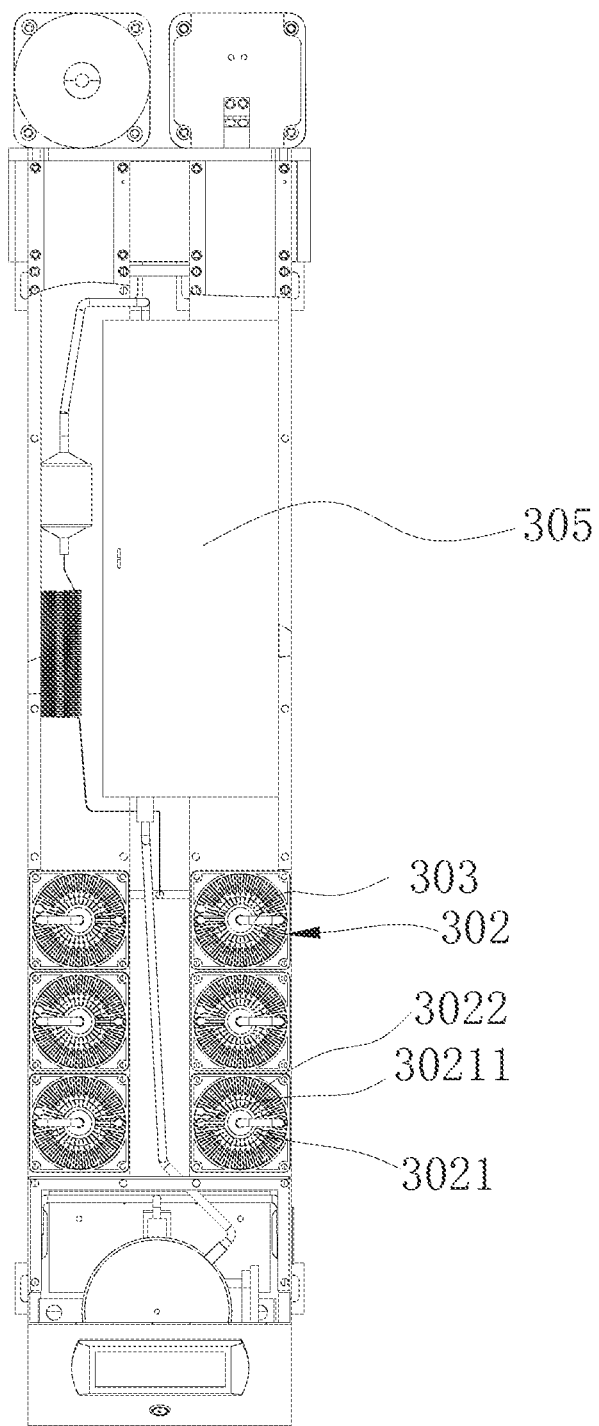
FIG. 13 is a top section view of a freeze dryer in another s embodiment of the disclosure.
Figure 14:
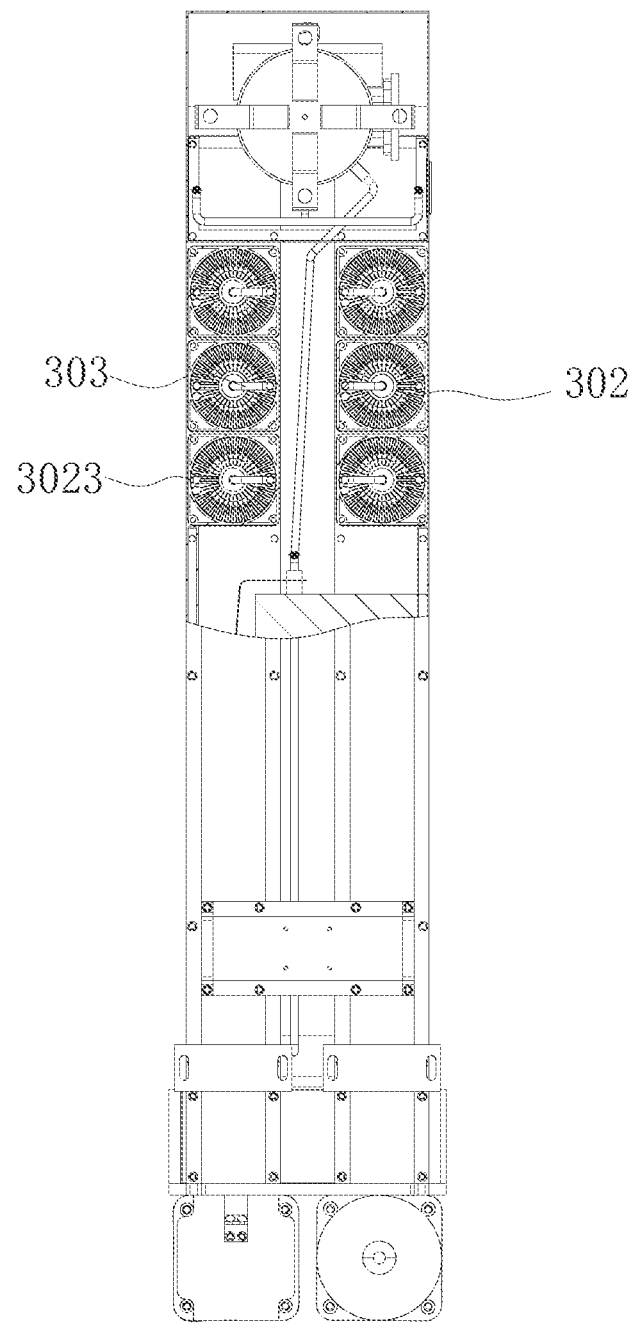
FIG. 14 is a bottom section view of a freeze dryer in another embodiment of the disclosure.

In another embodiment, the disclosure provides a freeze dryer, as shown in FIG. 12 to FIG. 14. FIG. 12 is a schematic perspective view of a freeze dryer in another embodiment of the disclosure, FIG. 13 is a top section view of a freeze dryer in another embodiment of the disclosure, and FIG. 14 is a bottom section view of a freeze dryer in another embodiment of the disclosure. The freeze dryer 300 includes a bearing base body 301, an evaporation device 302, and a condensation device 305.

Figure 15:
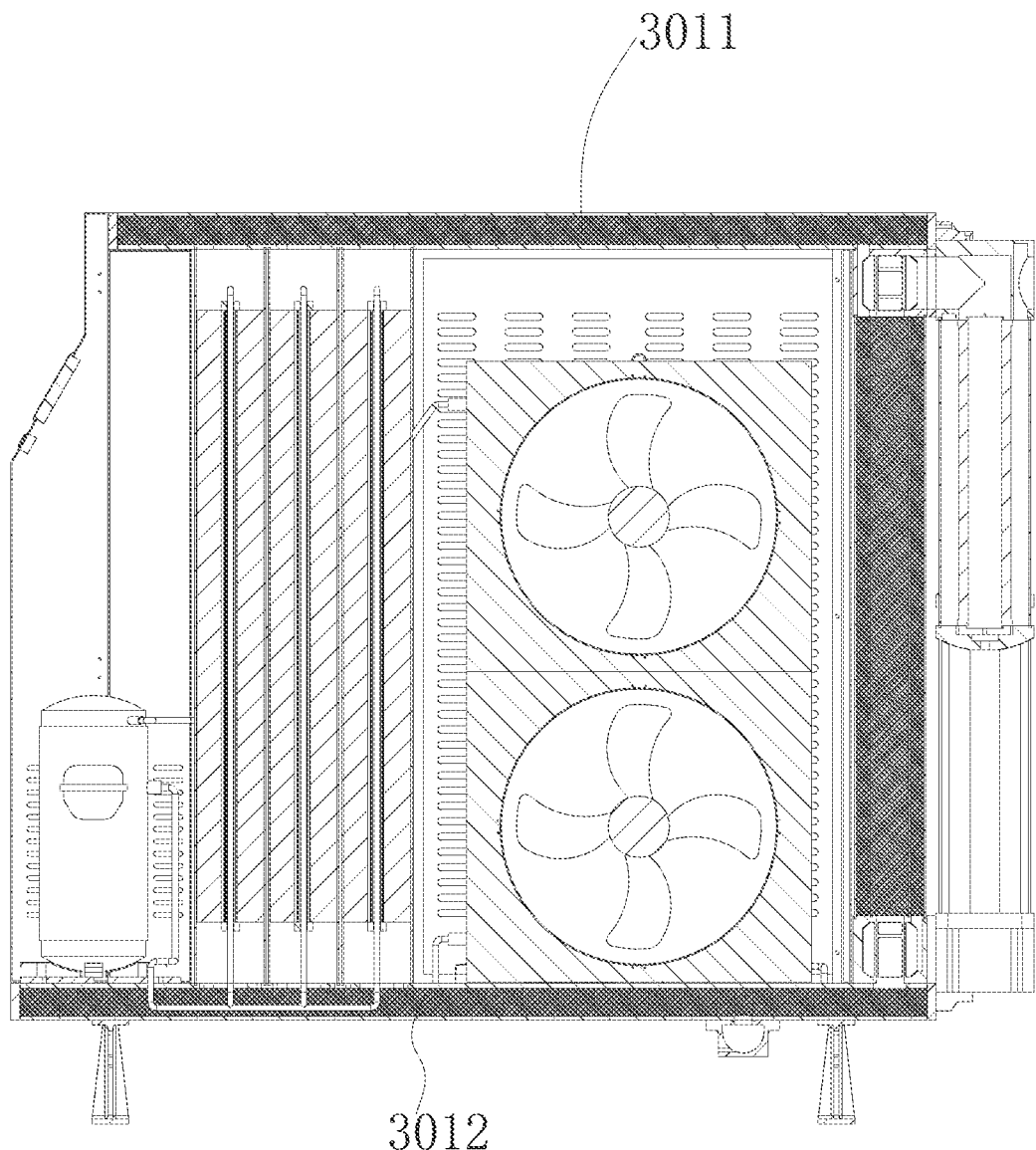
FIG. 15 is a longitudinal section view of a freeze dryer in another embodiment of the disclosure.
Figure 16:
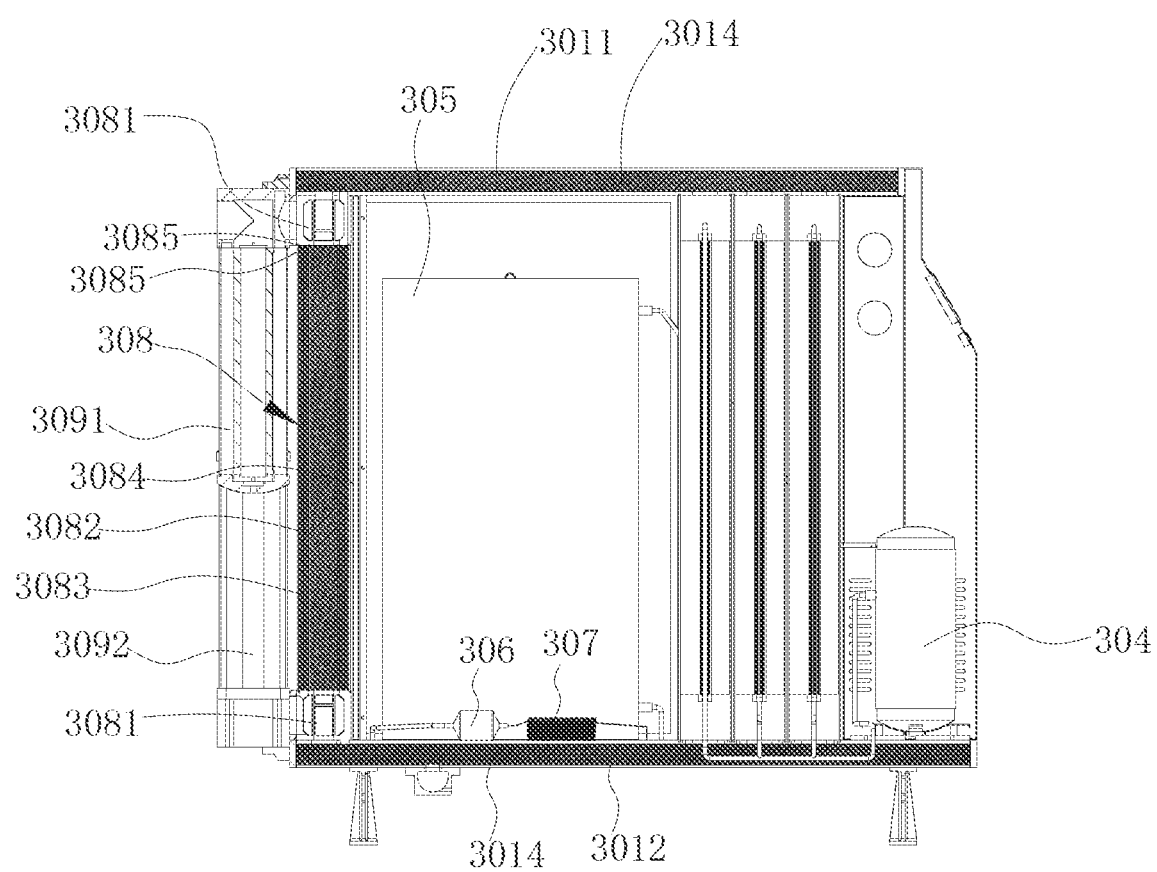
FIG. 16 is a longitudinal section view of a freeze dryer in another embodiment of the disclosure from another perspective.

The bearing base body 301 includes an upper seat body at the upper end and a lower seat body at the lower end. As shown in FIG. 15 and FIG. 16, FIG. 15 is a longitudinal section view of a freeze dryer in another embodiment of the disclosure, and FIG. 16 is a longitudinal section view of a freeze dryer in another embodiment of the disclosure from another perspective. Two upper airflow chambers 3011 are separately formed in the upper seat body, and two lower airflow chambers 3012 are separately formed in the lower seat body.

In addition, a shell 3013 can be sleeved between the upper seat body and lower seat body of the bearing base body 301. The shell 3013 covers the evaporation device 302 and the condensation device to prevent dust, water droplets, etc. from falling onto the evaporation device 302 and condensation device 305.

Both the evaporation device 302 and the condensation device 305 can include the structure of the heat exchange device 10*a* (the heat exchange device 10*b*) described above to realize the heat exchange function. The following description mainly takes the evaporation device 302 including the heat exchange device 10*b* as an example.

The freeze dryer 300 includes a plurality of evaporation devices 302, and each evaporation device 302 includes the heat exchange device 10*b* with the structure described above or a simple modified structure thereof. Each evaporation device 302 includes: at least one medium flow passage 30211 integrally molded by extrusion and a plurality of fins 3022 located on the outer periphery of the medium flow passage 30211. The evaporation device 302 includes a plurality of medium flow passages 30211, a part of the medium flow passages 30211 is formed by the medium tubes 3021, and the other part of the medium flow passages 30211 is formed by the fins 3022. The fins 3022 are fork-shaped or pliers-shaped. The pliers-shaped fin 3022 forms the medium flow passage 30211.

In this embodiment, as shown in FIG. 13 and FIG. 14, the number of pliers-shaped fins is slightly different from that shown in FIG. 5 above. In this embodiment, the evaporation device 302 is provided with three pliers-shaped fins, two of which are located directly on the left of the medium tube 3021, and the other is located directly on the right of the medium tube 3021; and there are four pliers-shaped fins shown in FIG. 5, which are located directly on the left, right, above, or below the middle medium tube. In this embodiment, the number and position of the pliers-shaped fins are changed without departing from the essence of the present invention. Therefore, the internal structure of the evaporation device 302 may directly adopt the same structure as the above-mentioned heat exchange device 10b or a structure modified from the heat exchange device 10b.

In actual application, a copper tube 3023 can be inserted into the medium flow passage 30211 formed by the fin 3022, and the copper tube is communicated with the medium tube 3021 through the connecting tube 303. As shown in FIG. 14, the refrigerant passes through the copper tube 3023 on the side from the bottom to the top, flows into the middle medium tube 3021 through the top connecting tube 303, and then flows from the top end of the middle medium tube 3021 to the bottom end.

Further, the freeze dryer 300 includes a refrigerant compressor 304, a refrigerant filter 306 and a throttling device 307. The gaseous refrigerant evaporated in the evaporation device 302 flows into the refrigerant compressor 304 through the tube for compression. The gaseous refrigerant is compressed by the refrigerant compressor 304 into a high-temperature and high-pressure liquid refrigerant, and then flows into the condensation device 305 through the tube for cooling. The high-temperature and high-pressure liquid refrigerant is cooled by the condensation device 305 into a low-temperature and high-pressure liquid refrigerant and flows into the refrigerant filter 306 for filtration, and after impurities are removed, flows into the throttling device 307 for pressure reduction, and finally enters the evaporation device 302 for evaporation.

The throttling device 307 described above may include an expansion valve or a capillary tube.

Figure 17:
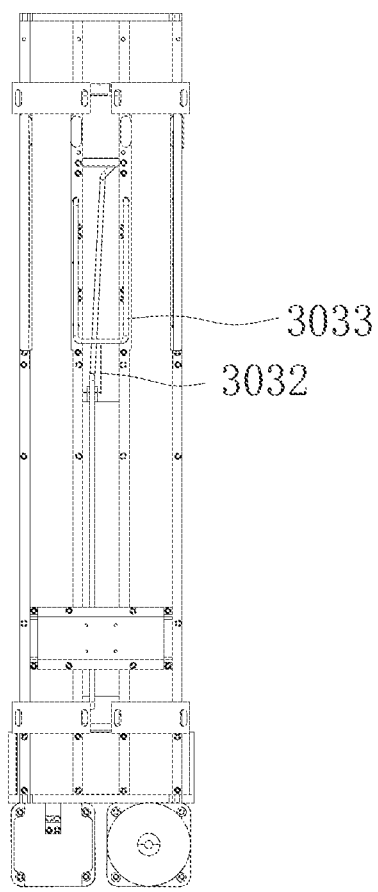
FIG. 17 is a schematic structural view, seen as from the bottom, of a freeze dryer showing a connecting tube in another embodiment of the disclosure.
Figure 18:
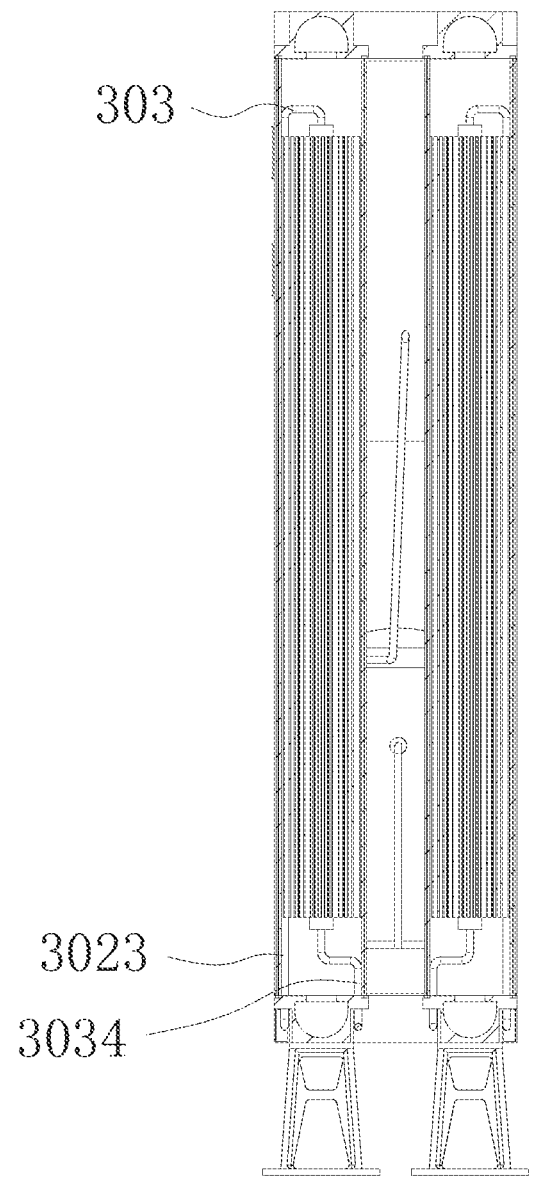
FIG. 18 is a horizontal section view of a freeze dryer in another embodiment of the disclosure.

Specifically, as shown in FIG. 17 and FIG. 18, FIG. 17 is a schematic structural view, seen as from the bottom, of a freeze dryer showing a connecting tube in another embodiment of the disclosure, and FIG. 18 is a horizontal section view of a freeze dryer in another embodiment of the disclosure, the refrigerant flows out of the capillary tube 3032 of the throttling device 307, and then flows into the copper tube 3023 of each evaporation device 302 through the connecting tube 3033, flows from the bottom end to the top end of the copper tube 3023, and then flows into the middle medium tube 3021 through the connecting tube 303, and flows from the top end to the bottom end of the medium tube 3021, and finally flows into the refrigerant compressor 304 through the connecting tube 3034. The connecting tube 3034 is bent to the side for a certain length and then passes through the bottom instead of directly passing out from the middle position, so as to ensure the air tightness of the lower airflow chamber 3012.

In the above embodiment, the two medium flow passages of the evaporation device 302 (that is, the middle medium tube and the peripheral copper tube) are configured to circulate the medium, and the other medium flow passages are temporarily vacant, but it is not limited to this. The number of medium flow passages used in the evaporation device 302 is variable, and it can be specifically determined according to actual application conditions. Through the connecting tube, the medium flow passages in the evaporation device 302 can be communicated in series or in parallel. Similarly, the medium flow passages of different evaporation devices 302 may also be communicated in series or in parallel through connecting tubes.

The upper end opening of the evaporation device 302 is communicated with the upper airflow chamber 3011, and the lower end opening is communicated with the lower airflow chamber 3012. The airflow enters the evaporation device 302 from the lower airflow chamber 3012 for heat exchange, and then flows out from the upper airflow chamber 3011.

In order to further cool the airflow, filter impurities in the airflow and divert the condensed moisture, metal meshes 3014 are provided in the upper airflow chamber 3011 and the lower airflow chamber 3012.

The condensation device 305 is installed between the upper airflow chamber 3011 and the lower airflow chamber 3012, and the inside of the condensation device 305 is isolated from the upper airflow chamber 3011 and the lower airflow chamber 3012.

The internal structure of the condensation device 305 may directly adopt the structure as the above-mentioned heat exchange device 10b (or the heat exchange device 10a) or a structure modified from the heat exchange device 10b (or the heat exchange device 10a). The main difference between the condensation device 305 and the evaporation device 302 is: the high-temperature and high-pressure liquid refrigerant is passed through the medium flow passage of the condensation device 305, and the low-temperature and low-pressure liquid refrigerant is passed through the medium flow passage of the evaporation device 302. The airflow introduced into the condensation device 305 for heat exchange with the refrigerant may be part of the airflow cooled by the evaporation device 302, or may be a cooling airflow introduced from the outside.

It can be understood that the condensation device 305 may not adopt the heat exchange device 10b (or the heat exchange device 10a) or a modified structure thereof. The condensation device 305 may adopt a conventional heat exchange device, for example, a heat exchange device composed of a circuitous copper tube and radiating fins welded on a circuitous copper tube.

Figure 19:
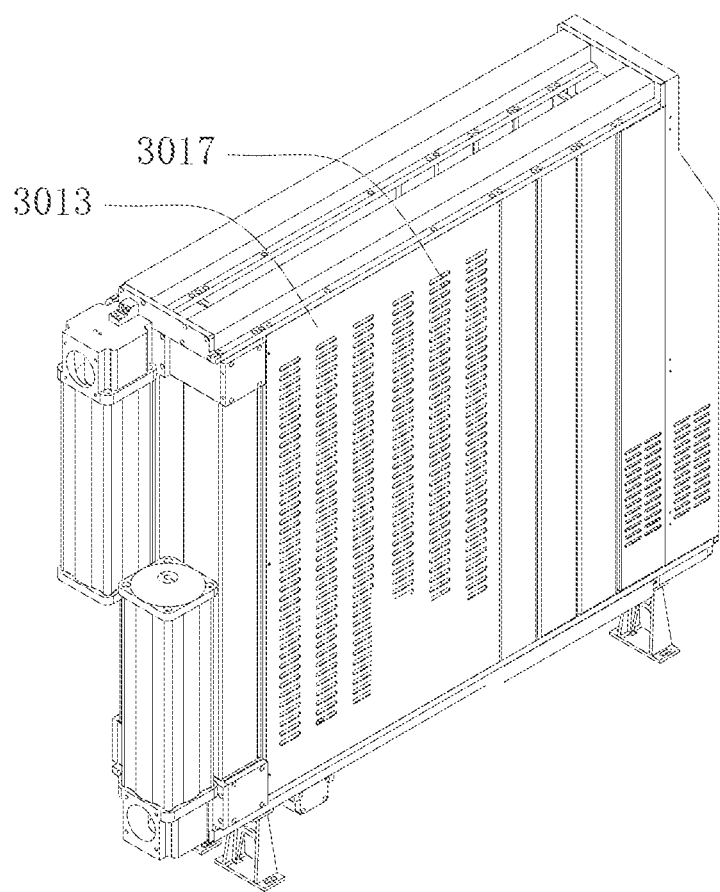
FIG. 19 is a perspective view of a freeze dryer in another embodiment of the disclosure from another perspective.

Further, as shown in FIG. 19, FIG. 19 is a perspective view of a freeze dryer in another embodiment of the disclosure from another perspective. A plurality of ventilation holes 3017 are arranged on the side face corresponding to the condensation device 305 of the shell 3013. Ventilation holes are also arranged on the housing of the heat exchange device of the condensation device 305 at the position corresponding to the ventilation holes on the housing 3013 to accelerate the circulation of the airflow inside the condensation device 305 and the outside airflow, and accelerate the heat dissipation.

Further, referring back to FIG. 12, a fan 3015 is further arranged on the side of the shell 3013, and the fan 3015 is directly embedded in the shell 3013.

Further, referring back to FIG. 16, the freeze dryer 300 further has an air inlet filter 3091 and an air outlet filter 3092. The air inlet filter 3091 is connected to the air inlet, and the air outlet filter is connected to the air outlet, in order to filter impurities in the gas at the air inlet and the air outlet.

Further, referring back to FIG. 16, the freeze dryer 300 is also provided with a heat regeneration device 308. The structure and function of the heat regeneration device 308 are similar to the heat regeneration device 50 of the freeze dryer 100 in the foregoing embodiment. The main difference is that in this embodiment, valve seats 3081 are also arranged at both ends of the heat regeneration device 308.

Specifically, the heat regeneration device 308 includes a heat regeneration inner tube 3082 and a heat regeneration outer tube 3083 sleeved on the periphery of the heat regeneration inner tube 3082. The chamber of the heat regeneration inner tube 3082 and the heat regeneration outer tube 3083 are filled with metal mesh 3084. The upper port of the heat regeneration outer tube 3083 is communicated with the air outlet of the air inlet filter 3091, and the lower port of the heat regeneration outer tube 3083 is communicated with the lower airflow chamber 3012. The upper port of the heat regeneration inner tube 3082 is communicated with the upper airflow chamber 3011 through the chamber of the valve seat 3081, and the lower port of the heat regeneration inner tube 3082 is communicated with the air inlet of the air outlet filter 3092 through the chamber of the valve seat 3081 at the lower end. In this way, the airflow is filtered by the air inlet filter 3091 and then enters the heat regeneration outer tube 3083 for pre-cooling, and then, after pre-cooling, enters the evaporation device 302 through the lower airflow chamber 3012 for cooling and drying. The cooled and dried airflow enters the heat regeneration inner tube 3082 and exchanges heat with the heat regeneration outer tube 3083, and, after the heat exchange, passes through the air outlet filter 3092 to flow to the gas-using end.

In addition, a gasket 3085 may be arranged around the ports of the heat regeneration inner tube 3082 and the heat regeneration outer tube 3083 to ensure the air tightness of the heat regeneration inner tube 3082 and the heat regeneration outer tube 3083.

The above is only preferred and feasible embodiments of the disclosure and do not limit the scope of the disclosure. All equivalent structural changes made by using the contents of the description and drawings of the disclosure are included in the scope of the disclosure.

What is claimed is:

1. A heat exchange device, comprising:
   a plurality of medium flow passages;
   a plurality of fins formed on the outer periphery of the medium flow passages, and arranged at intervals to form gaps allowing airflows to pass through, wherein all fins extend radially around a single center of the heat exchange device, each fin is located on a radial line radiating directly from the same single center of the heat exchange device, and an extending direction of each fin is a direction of radiating directly outward from the single center of the heat exchange device, wherein the single center is a geometric center of the heat exchange device; and
   a housing, in which the medium tube and the fins are placed;
   wherein fins extending from an outer surface of the medium flow passage at the center of the heat exchange device to the housing are arranged between any two adjacent media medium flow passages on a same circumference;
   wherein the housing is integrally molded by extrusion with all the fins;
   wherein the heat exchange device is integrally molded by extrusion to be a single piece.

2. The heat exchange device according to claim 1, wherein the heat exchange device further comprises:
   a plurality of medium tubes; and
   medium flow passages, formed inside the medium tubes;
   wherein the fins extend in the height direction of the medium tube, and each one of the medium tubes is connected with the fins at a outer wall.

3. The heat exchange device according to claim 2, wherein one of the medium tubes is located at the geometric center of the heat exchange device, the rest of the medium tubes are distributed in a circumference around the medium tube, and the fins extend in the radial direction of the medium tube at the geometric center on the outer periphery of the medium tube.

4. The heat exchange device according to claim 3, wherein the cross section of the heat exchange device is circular;
   wherein the plurality of medium tubes is distributed on a plurality of circumferences with different radii with the center of the cross section as the center of the circle.

5. The heat exchange device according to claim 1, wherein the heat exchange device further comprises:
   at least two medium flow passages;
   at least one medium tube, wherein a part of the medium flow passages are formed inside the medium tube, and the other part of the medium flow passages are formed by the fins, the fins extend in the height direction of the medium tube.

6. The heat exchange device according to claim 5, wherein one of the medium tubes is located at the geometric center of the heat exchange device, and the medium flow passages formed by the fins are distributed in a circumference around the medium tube at the geometric center, wherein the fins extend in the radial direction from the medium tube located at the geometric center.

7. The heat exchange device according to claim 6, wherein a copper tube is inserted into the medium flow passage formed by the fins.

8. The heat exchange device according to claim 5, wherein the fins are fork-shaped or pliers-shaped;
   wherein the fork-shaped fin comprises a rod part and a bifurcation part, wherein the rod part is connected with the medium tube located at the geometric center, and the bifurcation part is connected with the rod part;
   wherein the pliers-shaped fin comprises two oppositely arranged special-shaped fins, wherein the end of the special-shaped fins away from the geometric center are arc-shaped, and the arc-shaped ends of the two special-shaped fins enclose to form the medium flow passage.

9. The heat exchange device according to claim 5, wherein a plurality of protrusions protruding inward are arranged on the inner wall of the medium tube located at the geometric center of the heat exchange device.

10. The heat exchange device according to claim 1, wherein the heat exchange device is integrally molded by extrusion from aluminum alloy.

11. A freeze dryer, comprising:
    a bearing base body comprising an upper airflow chamber located at the upper end of the bearing base body and a lower airflow chamber located at the lower end of the bearing base body;
    an evaporation device communicated with the upper airflow chamber and the lower airflow chamber, wherein the evaporation device cools and dries gas by evaporating refrigerated medium;

a condensation device arranged between the upper end and the lower end of the bearing base body, wherein the condensation device is configured to cool the medium;
a refrigerant compressor;
a refrigerant filter;
a throttling device;
wherein the refrigerant compressor, the refrigerant filter and the throttling device are all arranged on a side area of the bearing base body;
wherein the vaporized refrigerated medium flows through the refrigerant compressor, the condensation device the refrigerant filter and the throttling device in turn to be cooled to a low-temperature and low-pressure liquid refrigerant;
wherein at least one of the evaporation device and the condensation device comprises a heat exchange device, which is integrally molded by extrusion to be a single piece, comprising:
a plurality of medium flow passages;
a plurality of fins formed on the outer periphery of the medium flow passage, and arranged at intervals to form gaps allowing airflows to pass through, wherein all fins extend radially around a single center of the heat exchange device, each fin is located on a radial line radiating directly from the same single center of the heat exchange device, and an extending direction of each fin is a direction of radiating directly outward from the single center of the heat exchange device, wherein the single center is a geometric center of the heat exchange device; and
a housing, in which the medium tube and the fins are placed in;
wherein fins extending from an outer surface of the medium flow passage at the center of the heat exchange device to the housing are arranged between any two adjacent media medium flow passages on a same circumference;
wherein the housing is integrally molded by extrusion with all the fins.

12. The freeze dryer according to claim 11, wherein the freeze dryer further comprises:
a heat regeneration device arranged between the upper end and the lower end of the bearing base body, wherein the heat regeneration device comprises a heat regeneration inner tube and a heat regeneration outer tube sleeved on the outer periphery of the heat regeneration inner tube;
wherein both ends of the heat regeneration outer tube are respectively communicated with the air inlet of the freeze dryer and the upper airflow chamber, so that the gas entering the freeze dryer exchanges heat with the low-temperature airflow in the heat regeneration inner tube within the heat regeneration outer tube to achieve pre-cooling, and the pre-cooled airflow flows to the evaporation device through the upper airflow chamber for cooling and drying;
wherein both ends of the heat regeneration inner tube are respectively communicated with the lower airflow chamber and the air outlet of the freeze dryer, so that the airflow cooled by the evaporation device enters the heat regeneration inner tube to exchange heat with the airflow in the heat regeneration outer tube, and the heat exchanged air flow flows out through the air outlet.

13. The freeze dryer according to claim 12, wherein both the heat regeneration inner tube and the heat regeneration outer tube are filled with metal mesh;
wherein the metal mesh in the heat regeneration inner tube is in close contact with the inner wall of the heat regeneration inner tube;
wherein the metal mesh in the heat regeneration outer tube is tightly connected between the inner wall of the heat regeneration outer tube and the outer wall of the heat regeneration inner tube.

14. The freeze dryer according to claim 11, wherein the freeze dryer further comprises:
a heat regeneration device arranged between the upper end and the lower end of the bearing base body, wherein the heat regeneration device comprises a heat regeneration inner tube, a heat regeneration outer tube sleeved on the outer periphery of the heat regeneration inner tube and valve seats located at both ends of the heat regeneration inner tube;
wherein the two ports of the heat regeneration outer tube are respectively communicated with the air inlet of the freeze dryer and the lower airflow chamber;
wherein both ends of the heat regeneration inner tube are respectively communicated with the lower airflow chamber and the air outlet of the freeze dryer through an inner chamber of the valve seat;
wherein both the heat regeneration inner tube and the heat regeneration outer tube are filled with metal mesh.

15. The freeze dryer according to claim 13, wherein the metal mesh is arranged in the upper airflow chamber and the lower airflow chamber.

16. The freeze dryer according to claim 11, wherein the heat exchange device comprises:
a plurality of medium tubes; and
medium flow passages, formed inside the medium tubes;
wherein the fins extend in the height direction of the medium tube, and each one of the medium tubes is connected with the fins at a outer wall.

17. The freeze dryer according to claim 11, wherein the heat exchange device further comprises:
at least two medium flow passages;
at least one medium tube, wherein a part of the medium flow passages are formed inside the medium tube, and the other part of the medium flow passages are formed by the fins, the fins extend in the height direction of the medium tube.

18. The freeze dryer according to claim 16, wherein the heat exchange device further comprises a housing, and the medium tube and the fins are placed in the housing;
wherein the housing is integrally molded by extrusion with the medium tube and the fins, or the medium tube and the fins are molded by extrusion and the housing is formed independently of the medium tube and the fin.

19. The freeze dryer according to claim 11, wherein the vaporized refrigerated medium flows into the refrigerant compressor by a connecting tube, and the connecting tube is bent to a side and passes through from an outer side of the lower airflow chamber, in order to ensure the air tightness of the lower airflow chamber.

* * * * *